UNITED STATES PATENT OFFICE.

ORSON A. DAVIS, OF SACRAMENTO, CALIFORNIA.

IMPROVEMENT IN ARTIFICIAL STONE.

Specification forming part of Letters Patent No. 194,297, dated August 21, 1877; application filed June 27, 1877.

*To all whom it may concern:*

Be it known that I, ORSON A. DAVIS, of Sacramento, in the county of Sacramento and State of California, have invented certain new and useful Improvements in Artificial Stones; and I do hereby declare the following to be a full, clear, and exact description of the invention, such as will enable others skilled in the art to which it pertains to make and use it.

My invention relates to artificial stone, and consists in a certain process for its manufacture, wherein a small proportion of fine sand and cement, previously wetted, heated, and pulverized, is compounded with a large proportion of coarse sand and cement. The mass is then treated with a solution of alum, milk-whey, and alcohol, and finally tamped in molds, moistened, and finished in full for use.

The object and purpose of the above composition is to produce a strong and very fine-grained stone, and—as the mechanical union of the parts going to form the composite mass is dependent for its closeness upon the fine quality of the ingredients—so I prepare the compound under the above steps, first obtaining the mixture of fine sand and cement, thoroughly united, ground to a close pulverization, and finally passed through a fine sieve.

By introducing this in small proportion in the layer compound of coarse sand and cement material is afforded for the latter to have the small interstices and spaces intervening between its individual particles filled up by this fine dry mixture, and thus a compact and close-bodied composition is obtained, which is peculiarly fitted to present a good fine-grained appearance, and resist strains in actual service.

My process of manufacture, more in detail, proceeds through the following steps: Equal parts of fine sand and good cement are mixed thoroughly together dry, then slightly moistened with water, and allowed to stand for about twenty-four hours. The mixture is then heated, preferably in an iron pan, over a moderate fire, for approximately two hours. After being cooled it is pulverized and passed through a fine sieve, when it is ready for application in the mass, made as below.

Sixty-six parts of coarse sharp sand, or sand and gravel, to thirty parts of cement, are mixed dry with four parts of the above-described compound. A solution, made by dissolving one pound of alum in nine gallons of water, adding one gallon of milk-whey and one gill of alcohol, is then treated to this mixture. The mass is tamped in molds suitable for the desired form of block or stone to be made in any special instance. Upon removal from the molds the stone is covered with a light cotton fabric to protect it, while still in a plastic state, from the force of the water, as the latter is sprinkled upon it from the watering-pot. The fabric covering also aids in preserving an equal and even moisture over the entire stone—not allowing one portion to be more severely treated than the rest—as the fibrous quality of the covering conducts the water through it onto the stone evenly and as through a sponge.

After keeping the stone wet for about ten days, following with a weak brine made by dissolving one pound of salt in eight gallons of water, I then for four days longer wet it with clear water.

The process is thus completed, though it is better, as an additional feature, to allow the stone to remain some eight or ten days preparatory to using.

A stone so made is given a fine grain and close composition—the result mainly of using the first-described mixture in small part, with the sand, cement, and solution in large proportion, as set forth.

Its use is in pavements, steps, sills, window-casings, caps, horse-blocks, and generally in buildings, sidewalks, or other suitable places.

To impart any desired color or tint to the compound, I may use an appropriate element to act as the pigment. Thus red oxide of iron may be used in order to produce a red stone, ultramarine to produce blue stone, and thus on for any appropriate color.

Having thus fully described my invention, what I claim as new, and desire to secure by Letters Patent, is—

A process of manufacturing stone, consisting in uniting, in small proportion, a fine mixture of sand and cement with a large proportion of coarse sand and cement, treating the compound with a solution of alum, milk-whey, and alcohol, molding the mass, and finally wetting and finishing the stone, substantially as set forth.

In testimony that I claim the foregoing I have hereunto set my hand this 18th day of June, 1877.

ORSON A. DAVIS.

In presence of—
CHAS. WOLLEB,
C. WEISEL.